Patented June 21, 1949

2,473,708

UNITED STATES PATENT OFFICE 2,473,708

POLYMERIZED VINYL AROMATIC MATERIALS

Ralph F. Hayes, Springfield, Mass., assignor to Monsanto Chemical Company, St. Louis, Mo., a corporation of Delaware No Drawing. Application June 30, 1943, Serial No. 492,892

2 Claims. (Cl. 260—30.8)

This invention relates to an improved process for polymerizing vinyl aromatic materials such as styrene and the products obtained thereby.

A serious problem in the polymerization of styrene is to prepare a polymer with a clear smooth surface that remains free from crazing on long exposure in sunlight. Attempts have been made to overcome this defect, for example, by milling the polymerized product on hot rolls whereby it is believed certain volatile materials are removed which cause crazing. This method adds to the cost of the polymer and, furthermore, cannot be employed when cast articles are desired.

One object of this invention is to provide an improved process for polymerizing vinyl aromatic materials. A particular object is to provide an improved process for preparing cast polymerized styrene articles free from crazing on long standing.

According to the present invention vinyl aromatic materials are polymerized in the presence of dialkyl esters of sulpho-dicarboxylic acids or their salts. More particularly, a dialkyl ester of sulpho-succinic acid or a salt thereof is dissolved in monomeric styrene and the resulting mixture polymerized at elevated temperatures whereby a polymeric product with improved properties is obtained.

Vinyl aromatic materials included within the scope of the invention are those compounds containing a single benzene ring which has attached thereto a vinyl ($CH_2=CH-$) or a substituted vinyl ($CH_2=C<$) radical. Examples of such compounds are styrene, ortho-methyl-styrene, para-methyl-styrene, ortho-chlor-styrene, para-chlor-styrene, ortho-bromo-styrene, dichloro-styrenes, para-isopropyl-styrene, and divinyl-benzene. When desired mixtures of vinyl aromatic materials such as those mentioned above may be employed or mixtures with materials copolymerizable therewith wherein the vinyl aromatic material predominates, for example, mixtures of styrene and vinyl chloride, vinyl acetate, methyl acrylate, butadiene, maleic anhydride and the like.

The composition of the dialkyl sulpho-dicarboxylic acid may be substantially varied. However, in general it is preferred that the dicarboxylic acid residue contain from 4 to 6 carbon atoms and that the alkyl radicals contain not over 20 carbon atoms. As examples of dialkyl esters of sulpho-dicarboxylic acids may be mentioned dimethyl sulpho-succinate, diamyl sulpho-succinate, dioctyl sulpho-succinate, the sodium salt of dioctyl sulpho-succinate, didecyl sulpho-succinate, dihexadecyl sulpho-succinate, diethyl sulpho-adipate, the sodium salt of dioctyl sulpho-adipate, the sodium salt of diamyl sulpho-adipate.

The dialkyl esters of sulpho-succinic acid and their salts are described in U. S. Patent 2,028,091.

When desired, mixed esters may be employed, for example, the sodium salt of amyl octyl sulpho-succinate. Also, when desired the alkyl groups may be substituted, for example, by halogen atoms. As examples may be mentioned di-(mono-chloro-amyl) sulpho-succinate and di (dichloro-octyl) sulpho-succinate.

According to a preferred embodiment of this invention alkyl esters of sulpho-dicarboxylic acids or their salts, e. g. sodium or potassium salts, are employed in which the alkyl groups contain from 5 to 10 carbon atoms and the acid residue contains from 4 to 6 carbon atoms.

The following examples are illustrative of the present invention, but not limitative thereof. Where parts are given, they are parts by weight.

Example I

| | Parts |
|---|---|
| Monomeric styrene | 100 |
| Sodium salt of dioctyl sulpho-succinate | 0.10 |

The sodium salt of dioctyl sulpho-succinate is dissolved in the monomeric styrene and the resulting mixture is polymerized by heating for 16 hours at 105° C. and then 6 hours at 125° C. and finally 40 hours at 150° C. in a mold designed to produce the polymer in the form of sheets, the broad surfaces of the mold being made of glass. The resulting polymer is a clear, transparent product which may be readily removed without injury to the surface thereof from the mold. The polymer sheet is found to contain only about 2.8% methanol soluble material and does not craze after long exposure to the sun.

In contrast to this product, styrene polymer prepared in the same manner except that no sodium salt of dioctyl sulpho-succinate is employed, is found to have about 3.5% of methanol soluble material and cast articles made in this manner craze upon being given the same exposure as that given the product described in the above example.

Example II

| | Parts |
|---|---|
| Monomeric styrene | 100 |
| Sodium salt of dioctyl sulpho-succinate | 0.05 |

The sodium salt of dioctyl sulpho-succinate is dissolved in the monomeric styrene and the resulting solution is poured into a mold similar to the one employed in Example I. The polymerization is carried out substantially as in Example I. The resulting polymer sheet is readily removed from the mold. The sheet is transparent and the broad surfaces thereof are smooth and clear.

*Example III*

| | Parts |
|---|---|
| Monomeric styrene | 100 |
| Sodium salt of dioctyl sulpho-succinate | 0.5 |

The sodium salt of dioctyl sulpho-succinate is mixed with the monomeric styrene and the resulting mixture is poured into a glass mold and polymerized by heating to a temperature of 135° C. for 23 hours, followed by 22 hours at 175° C. The product, which is readily removed from the mold, possesses an attractive pearlescent appearance and forms a very desirable base material for producing colored decorative articles.

The proportion of the ester of sulpho-dicarboxylic acid or of the salt thereof may be substantially varied, for example, up to 5%. In general it is desirable that at least 0.01% of the ester or its salt be employed based on the amount of monomeric styrene. When crystal clear products are desired, from 0.01 to 0.1% of the ester or its salt is found to be preferred. Beautifully opalescent materials are obtained when from 0.5 to 1% of the ester or its salt is employed.

The polymerization conditions may be substantially varied, particularly as to time and temperature, provided the polymerization is continued sufficiently to reduce the methanol soluble content of the product to below 3% when prevention of crazing of the product on long standing is desired. In place of monomeric styrene, styrene that has been partially polymerized or a solution of polymeric styrene in monomeric styrene may be employed.

In place of molds made of glass, molds made from other materials may be employed, for example, metal molds made from such metals as stainless steel, nickel, aluminum and the like.

Where the dialkyl esters of sulpho-dicarboxylic acids are referred to in the claims, it is meant to include not only free esters, but their alkali metal salts.

I claim:

1. In a process for polymerizing styrene to a polymerization product free from crazing on long standing, the steps which compromise incorporating in styrene 0.01–5% based on the amount of styrene, of the sodium salt of dioctyl sulfo-succinate and heating the resulting mixture for a sufficient length of time to reduce the methanol-soluble content of the resulting polymeric product to below 3%.

2. A process as defined in claim 1 in which the sodium salt of dioctyl sulfo-succinate is present in an amount equal to 0.01–1.0% of the amount of styrene.

RALPH F. HAYES.

REFERENCES CITED

The following references are of record in the file of this patent:

UNITED STATES PATENTS

| Number | Name | Date |
|---|---|---|
| 2,098,190 | Kyrides | Nov. 2, 1937 |
| 2,157,049 | Bartoe | May 2, 1939 |
| 2,272,847 | Macht | Feb. 10, 1942 |
| 2,275,716 | Bachman | Mar. 10, 1942 |
| 2,300,260 | Staff | Feb. 16, 1943 |
| 2,355,533 | Holst | Aug. 8, 1944 |
| 2,394,407 | Soday | Feb. 5, 1946 |
| 2,408,690 | Seymour | Oct. 1, 1946 |